United States Patent
Perez et al.

(10) Patent No.: US 11,376,817 B2
(45) Date of Patent: Jul. 5, 2022

(54) WEAR RESISTANT ARTICLES AND APPLICATIONS THEREOF

(71) Applicant: Kennametal Inc., Latrobe, PA (US)

(72) Inventors: Martin G. Perez, Latrobe, PA (US); Michael J. Meyer, Ligonier, PA (US); Qingjun Zheng, Export, PA (US)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 16/931,927

(22) Filed: Jul. 17, 2020

(65) Prior Publication Data

US 2021/0031492 A1    Feb. 4, 2021

Related U.S. Application Data

(60) Provisional application No. 62/880,337, filed on Jul. 30, 2019.

(51) Int. Cl.
| | |
|---|---|
| *B32B 15/01* | (2006.01) |
| *B32B 15/18* | (2006.01) |
| *C22C 29/08* | (2006.01) |
| *B32B 18/00* | (2006.01) |
| *B32B 7/05* | (2019.01) |
| *C22C 38/08* | (2006.01) |
| *B32B 7/027* | (2019.01) |
| *C22C 19/03* | (2006.01) |
| *C22C 1/04* | (2006.01) |
| *B32B 15/16* | (2006.01) |
| *C22C 19/07* | (2006.01) |
| *C22C 38/10* | (2006.01) |

(52) U.S. Cl.
CPC ............. *B32B 15/18* (2013.01); *B32B 7/05* (2019.01); *B32B 18/00* (2013.01); *C22C 29/08* (2013.01); *B32B 7/027* (2019.01); *B32B 15/013* (2013.01); *B32B 15/16* (2013.01); *B32B 2250/03* (2013.01); *B32B 2260/02* (2013.01); *B32B 2260/04* (2013.01); *B32B 2264/107* (2013.01); *B32B 2305/80* (2013.01); *B32B 2307/302* (2013.01); *B32B 2311/22* (2013.01); *B32B 2311/30* (2013.01); *B32B 2313/04* (2013.01); *B32B 2315/02* (2013.01); *C22C 1/0433* (2013.01); *C22C 19/03* (2013.01); *C22C 19/07* (2013.01); *C22C 38/08* (2013.01); *C22C 38/105* (2013.01); *Y10T 428/12576* (2015.01); *Y10T 428/12757* (2015.01); *Y10T 428/12937* (2015.01)

(58) Field of Classification Search
CPC ........ B32B 7/02; B32B 7/0027; B32B 15/16; B32B 15/18; B32B 18/00; B32B 2250/03; B32B 2260/02; B32B 2260/04; B32B 2264/10; B32B 2264/107; B32B 2305/30; B32B 2305/80; B32B 2307/302; B32B 2311/22; B32B 2311/30; B32B 2313/04; B32B 2315/02; C22C 1/04; C22C 1/0433; C22C 1/0441; C22C 19/03; C22C 19/07; C22C 29/08; C22C 38/08; C22C 38/105; Y10T 428/12576; Y10T 428/12757; Y10T 428/12937
USPC ........................................................ 428/679
See application file for complete search history.

(56) References Cited

U.S. PATENT DOCUMENTS

| | | |
|---|---|---|
| 3,876,447 A | 4/1975 | Lally |
| 4,073,639 A | 2/1978 | Duvall et al. |
| 4,381,944 A | 5/1983 | Smith, Jr. et al. |
| 4,493,451 A | 1/1985 | Clark et al. |
| 4,614,296 A | 9/1986 | Lesgourgues |
| 4,830,934 A | 5/1989 | Ferrigno et al. |
| 4,940,566 A | 7/1990 | Wood et al. |
| 5,156,321 A | 10/1992 | Liburdi et al. |
| 5,240,491 A | 8/1993 | Budinger et al. |
| 5,348,215 A | 9/1994 | Rafferty et al. |

(Continued)

FOREIGN PATENT DOCUMENTS

| | | | |
|---|---|---|---|
| CN | 106541223 A | 3/2017 | |
| WO | WO1994011139 A1 | 5/1994 | |
| WO | WO-2019151402 A1 * | 8/2019 | ............. C22C 38/00 |

OTHER PUBLICATIONS

X. Wang et al. "Mechanical properties and wear resistance of functionally graded WC-Co", 2013, International Journal of Refractory Metals and Hard Materials, 36, p. 46-51. (Year: 2013).*

(Continued)

*Primary Examiner* — Humera N. Sheikh
*Assistant Examiner* — John D Schneible
(74) *Attorney, Agent, or Firm* — Larry R. Meenan

(57) ABSTRACT

Wear resistant articles are described herein which, in some embodiments, mitigate CTE differences between wear resistant components and metallic substrates. In one aspect, an article comprises a layer of sintered cemented carbide bonded to a layer of iron-based alloy via a metal-matrix composite bonding layer, wherein coefficients of thermal expansion (CTE) of the sintered cemented carbide layer, metal matrix composite bonding layer, and iron-based alloy layer satisfy the relation:

$$x = \frac{(|CTE\ WC - CTE\ MMC|)}{(|CTE\ MMC - CTE\ Fe|)}$$

wherein $0.5 \leq x \leq 2$ and CTE WC, CTE MMC and CTE Fe are the CTE values for the sintered cemented carbide, metal matrix composite, and iron-based alloy in 1/K respectively at 900° C. to 1100° C.

15 Claims, No Drawings

(56) References Cited

U.S. PATENT DOCUMENTS

| | | | |
|---|---|---|---|
| 5,523,169 A | 6/1996 | Rafferty et al. | |
| 5,940,566 A | 8/1999 | Seng | |
| 5,952,042 A | 9/1999 | Rafferty et al. | |
| 7,115,679 B2 | 10/2006 | Ellison et al. | |
| 7,857,194 B2 | 12/2010 | Kramer | |
| 2006/0035082 A1* | 2/2006 | Hattori | B21B 27/032 |
| | | | 428/408 |
| 2006/0043567 A1* | 3/2006 | Palanduz | H01L 23/15 |
| | | | 257/697 |
| 2006/0185908 A1* | 8/2006 | Kembaiyan | E21B 10/54 |
| | | | 175/425 |
| 2007/0269676 A1* | 11/2007 | Singer | B29C 48/509 |
| | | | 428/627 |
| 2009/0053423 A1* | 2/2009 | Freti | C23C 30/005 |
| | | | 427/419.7 |
| 2010/0276209 A1* | 11/2010 | Yong | C22C 29/02 |
| | | | 427/446 |
| 2011/0248549 A1* | 10/2011 | Knotts | E21C 35/18 |
| | | | 299/105 |
| 2012/0121923 A1* | 5/2012 | Palumbo | C23C 28/021 |
| | | | 428/586 |
| 2013/0136941 A1* | 5/2013 | Zheng | B32B 7/02 |
| | | | 428/550 |
| 2014/0271319 A1* | 9/2014 | Zheng | B32B 15/015 |
| | | | 419/9 |
| 2014/0272446 A1* | 9/2014 | Zheng | B32B 15/18 |
| | | | 428/545 |
| 2016/0318282 A1* | 11/2016 | Muchtar | C22C 38/44 |
| 2017/0074046 A1* | 3/2017 | Izbinski | C22C 29/08 |
| 2017/0233852 A1* | 8/2017 | Yao | C23C 4/06 |
| | | | 428/680 |
| 2018/0038167 A1* | 2/2018 | Xu | B23K 15/0006 |

OTHER PUBLICATIONS

Columbia Metals, "Controlled Expansion Alloys", 2018, Columbia Metals LTD (Year: 2018).*

* cited by examiner

WEAR RESISTANT ARTICLES AND APPLICATIONS THEREOF

CROSS REFERENCE TO RELATED APPLICATIONS

This application claims priority pursuant to 35 U.S.C. § 119(e) to U.S. Provisional Patent Application No. 62/880,337, filed Jul. 30, 2019, which is hereby incorporated by reference in its entirety.

FIELD

The present invention relates to wear resistant compositions and, in particular, to wear pads and claddings for metallic articles.

BACKGROUND

Wear pads and claddings are often applied to articles or components subjected to harsh environments or operating conditions in efforts to extend the useful lifetime of the articles or components. Various wear pad constructions are available depending on the mode of failure to be inhibited. For example, wear resistant, erosion resistant and corrosion resistant pads have been developed for metal and alloy substrates. However, wear pads and metallic substrates often exhibit substantial differences in coefficients of thermal expansion (CTE). CTE differences can induce high amounts of strain in the wear pad subsequent to brazing or bonding to the metallic substrate. High amounts of strain induce cracking and other premature failure modes of the wear pad.

SUMMARY

In view of the foregoing disadvantages, articles are described herein which, in some embodiments, mitigate CTE differences between wear resistant components and metallic substrates. In one aspect, an article comprises a layer of sintered cemented carbide bonded to a layer of iron-based alloy via a metal-matrix composite bonding layer, wherein coefficients of thermal expansion (CTE) of the sintered cemented carbide layer, metal matrix composite bonding layer, and iron-based alloy layer satisfy the relation:

$$x = \frac{(|CTE\ WC - CTE\ MMC|)}{(|CTE\ MMC - CTE\ Fe|)}$$

wherein 0.5≤x≤2 and CTE WC, CTE MMC and CTE Fe are the CTE values for the sintered cemented carbide, metal matrix composite, and iron-based alloy in 1/K respectively at 900° C. to 1100° C. In some embodiments, (CTE Fe−CTE WC) is 2 to 6×10$^{-6}$ 1/K.

In another aspect, methods of making wear resistant articles are described herein. A method of making an article, in some embodiments, comprises bonding a layer of sintered cemented carbide to a layer of iron-based alloy via a metal-matrix composite bonding layer, wherein coefficients of thermal expansion (CTE) of the sintered cemented carbide layer, metal matrix composite bonding layer, and iron-based alloy layer satisfy the relation:

$$x = \frac{(|CTE\ WC - CTE\ MMC|)}{(|CTE\ MMC - CTE\ Fe|)}$$

wherein 0.5≤x≤2 and CTE WC, CTE MMC and CTE Fe are the CTE values for the sintered cemented carbide, metal matrix composite, and iron-based alloy in 1/K respectively at 900° C. to 1100° C.

These and other embodiments are further described in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Wear Resistant Articles

In one aspect, articles described herein comprise a layer of sintered cemented carbide bonded to a layer of iron-based alloy via a metal-matrix composite bonding layer, wherein coefficients of thermal expansion (CTE) of the sintered cemented carbide layer, metal matrix composite bonding layer, and iron-based alloy layer satisfy the relation:

$$x = \frac{(|CTE\ WC - CTE\ MMC|)}{(|CTE\ MMC - CTE\ Fe|)}$$

wherein 0.5≤x≤2 and CTE WC, CTE MMC and CTE Fe are the CTE values for the sintered cemented carbide, metal matrix composite, and iron-based alloy in 1/K respectively at 900° C. to 1100° C.

Turning now to specific components, the sintered cemented carbide layer can comprise metal carbide grains selected from the group consisting of Group IVB metal carbides, Group VB metal carbides, Group VIB metal carbides, and mixtures thereof.

Sintered cemented carbide, for example, can comprise tungsten carbide (WC). WC can be present in the sintered carbide in an amount of at least 70 weight percent or in an amount of at least 80 weight percent. Additionally, metallic binder of cemented carbide can comprise cobalt or cobalt alloy. Cobalt binder, for example, can be present in the sintered cemented carbide in an amount ranging from 3 weight percent to 30 weight percent. In some embodiments, cobalt binder is present in the sintered cemented carbide layer in an amount ranging from 10-25 weight percent or from 15-20 weight percent. Metallic binder of the sintered cemented carbide layer can also comprise one or more additives, such as noble metal additives. In some embodiments, the metallic binder can comprise an additive selected from the group consisting of platinum, palladium, rhenium, rhodium and ruthenium and alloys thereof. In other embodiments, an additive to the metallic binder can comprise molybdenum, silicon or combinations thereof. Additive can be present in the metallic binder in any amount not inconsistent with the objectives of the present invention. For example, additive(s) can be present in the metallic binder in an amount of 0.1 to 10 weight percent of the sintered cemented carbide layer.

The sintered cemented carbide layer can also comprise one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the sintered cemented carbide. In such embodiments, the sintered carbide can comprise one or more solid solution carbides in an amount ranging from 0.1-5 weight percent.

The sintered cemented carbide layer can have any desired thickness. Thickness of the sintered cemented carbide layer can be selected according to several considerations, including the specific compositional parameters of the sintered layer and desired wear characteristics of the article. In some embodiments, the sintered cemented carbide layer has thickness of at least 5 mm or at least 10 mm. A sintered cemented carbide layer, for example, can have thickness of 10 mm to 100 mm, in some embodiments.

The sintered cemented carbide layer can generally have a CTE of $6-9 \times 10^{-6}$ 1/K. In some embodiments, for example, the sintered cemented carbide layer has a CTE of $7-8 \times 10^{-6}$ 1/K. CTE of the sintered cemented carbide layer can be chosen according to several considerations including, but not limited to, desirable wear characteristics of the layer and CTE of the metal matrix composite layer. CTE of the sintered cemented carbide layer can be varied by altering the compositional parameters of the layer.

Articles described herein also comprise a metal matrix composite layer. The metal matrix composite layer bonds the sintered cemented carbide layer to the iron-based alloy layer. The metal matrix composite layer comprises hard particles dispersed in matrix alloy. Hard particles can comprise particles of metal carbides, metal nitrides, metal carbonitrides, metal borides, metal silicides, cemented carbides, cast carbides, intermetallic compounds or other ceramics or mixtures thereof. In some embodiments, metallic elements of hard particles comprise aluminum, boron, silicon and/or one or more metallic elements selected from Groups IVB, VB, and VIB of the Periodic Table. Groups of the Periodic Table described herein are identified according to the CAS designation.

In some embodiments, for example, hard particles comprise carbides of tungsten, titanium, chromium, molybdenum, zirconium, hafnium, tanatalum, niobium, rhenium, vanadium, boron or silicon or mixtures thereof. Hard particles, in some embodiments, comprise nitrides of aluminum, boron, silicon, titanium, zirconium, hafnium, tantalum or niobium, including cubic boron nitride, or mixtures thereof. Additionally, in some embodiments, hard particles comprise borides such as titanium di-boride, B4C or tantalum borides or silicides such as $MoSi_2$ or $Al_2O_3$—SiN. Hard particles can comprise crushed carbide, crushed nitride, crushed boride, crushed silicide or mixtures thereof.

Tungsten carbide hard particles can comprise microcrystalline tungsten carbide, cast tungsten carbide, polycrystalline tungsten carbide containing metallic binder in an amount less than 3 weight percent, sintered cemented carbide and/or mixtures thereof. Sintered cemented tungsten carbide particles employed in the hard particle component can have any desired amount of metallic binder. Metallic binder content of sintered cemented tungsten carbide particles can be selected according to several considerations including desired hardness and wear resistance of the particles. In some embodiments, sintered cemented tungsten carbide particles comprise 3 to 20 weight percent metallic binder. Metallic binder of sintered cemented carbide particles can comprise cobalt, nickel, iron, or various alloys thereof.

Hard particles can be present in the metal matrix composite bonding layer in any desired amount. Hard particle amount can be selected according to several considerations including compositional identity of hard particles and desired coefficient of thermal expansion of the metal matrix composite layer. Hard particles can generally be present in the metal matrix composite bonding layer in an amount of 20 weight percent to 70 weight percent. In some embodiments, hard particles are present in the metal matrix bonding layer in an amount of 25 weight percent to 60 weight percent or 30 weight percent to 50 weight percent.

The hard particles are dispersed in matrix alloy. In some embodiments, matrix alloy of the composite bonding layer comprises nickel-based alloy. Nickel-based matrix alloy can have a composition selected from Table I, in some embodiments.

TABLE I

| Nickel-based alloy matrix | |
|---|---|
| Element | Amount (wt. %) |
| Chromium | 0-30 |
| Molybdenum | 0-28 |
| Tungsten | 0-15 |
| Niobium | 0-6 |
| Tantalum | 0-6 |
| Titanium | 0-6 |
| Iron | 0-30 |
| Cobalt | 0-15 |
| Copper | 0-50 |
| Carbon | 0-2 |
| Manganese | 0-2 |
| Silicon | 0-10 |
| Phosphorus | 0-10 |
| Sulfur | 0-0.1 |
| Aluminum | 0-1 |
| Boron | 0-5 |
| Nickel | Balance |

For example, nickel-based matrix alloy can comprise 1-10 wt. % chromium, 0-5 wt. % molybdenum, 0-10 wt. % titanium, 0-5 wt. % silicon, 0-3 wt. % boron, 0-15 wt. % tungsten, 0-2 wt. % carbon and the balance nickel.

In some embodiments, matrix alloy of the composite bonding layer comprises cobalt-based alloy. Cobalt-based alloy can have a composition selected from Table II, in some embodiments.

TABLE II

| Cobalt-based alloy matrix | |
|---|---|
| Element | Amount (wt. %) |
| Chromium | 0-30 |
| Tungsten | 0-15 |
| Molybdenum | 0-20 |
| Nickel | 0-20 |
| Iron | 0-25 |
| Tantalum | 0-5 |
| Manganese | 0-2 |
| Silicon | 0-5 |
| Vanadium | 0-5 |
| Titanium | 0-1 |
| Zirconium | 0-1 |
| Carbon | 0-4 |
| Boron | 0-5 |
| Copper | 0-5 |
| Cobalt | Balance |

In some embodiments, for example, cobalt-based matrix alloy comprises 20-27 wt. % chromium, 8-12 wt. % nickel, 5-8 wt. % tungsten, 2-5 wt. % tantalum, 0-3 wt. % boron, 0.1-2 wt. % titanium, 0.1-2 wt % zirconium and 0.3-2 wt. % carbon and the balance cobalt.

The metal matrix composite bonding layer can generally have a CTE of $8\text{-}12\times10^{-6}$ 1/K. In some embodiments, for example, the metal matrix composite bonding layer has a CTE of $9\text{-}11\times10^{-6}$ 1/K. CTE of the metal matrix composite layer can be adjusted based on CTE of the sintered cemented carbide layer and/or iron-based alloy layer. The metal matrix composite bonding layer can have any desired thickness. In some embodiments, the metal matrix bonding layer has thickness of 0.2 mm to 5 mm.

Articles described herein also comprise an iron-based alloy layer bonded to the sintered cemented carbide layer by the metal matrix composite layer. Any iron-based alloy satisfying the CTE relation described herein can be used. In some embodiments, principal elements of the iron-based alloy layer are nickel and cobalt in addition to the iron. The iron-based alloy, for example, can comprise a composition selected from Table III.

TABLE III

Iron-based alloy layer

| Element | Amount (wt. %) |
|---|---|
| Cobalt | 6-25 |
| Nickel | 25-35 |
| Manganese | 0-1 |
| Silicon | 0-1 |
| Carbon | 0-0.5 |
| Iron | Balance |

The iron-based alloy layer can generally have a CTE of $11\text{-}14\times10^{-6}$ 1/K. In some embodiments, the iron-based alloy layer has a CTE of CTE of $12\text{-}13\times10^{-6}$ 1/K. CTE of the iron-based alloy layer can be selected according to several considerations including CTE of the metal matrix composite layer and/or CTE of a substrate to which the article can be bonded. In some embodiments, (CTE Fe–CTE WC) is 2 to $6\times10^{-6}$ 1/K.

Articles described herein, for example, serve as wear components, such as wear pads or claddings, for metallic substrates. In such embodiments, the iron-based alloy layer can be bonded to the substrate surface. Articles described herein can serve as wear pads or claddings for steel substrates. Accordingly, CTE of the iron-based alloy layer can be selected with reference to composition and CTE of the metallic substrate to which the article is bonded. In some embodiments, articles comprising the layered construction described herein can be screen tiles, shovel teeth, grader edges, hopper tiles and other wear parts. Articles described herein can be employed in the oil and gas industry as well as mining and/or earth moving applications.

The iron-based alloy layer can have any desired thickness. In some embodiments, the iron-based alloy layer has thickness of at least 5 mm.

CTE values for the sintered cemented carbide layer, metal matrix composite layer, and iron-based alloy layer can generally be determined according to ASTM E288-17 Standard Test Method for Linear Thermal Expansion of Solid Materials with a Push-Rod Dilatometer. The CTE for each layer can be determined prior to the layer being incorporated into the wear resistant article. Alternatively, the CTE of each layer can be determined after formation of the layered article wherein the sintered cemented carbide layer is bonded to the iron-based alloy layer via the metal matrix composite layer.

II. Methods of Making Wear Resistant Articles

In another aspect, methods of making wear resistant articles are described herein. A method of making an article, in some embodiments, comprises bonding a layer of sintered cemented carbide to a layer of iron-based alloy via a metal-matrix composite bonding layer, wherein coefficients of thermal expansion (CTE) of the sintered cemented carbide layer, metal matrix composite bonding layer, and iron-based alloy layer satisfy the relation:

$$x = \frac{(|CTE\ WC - CTE\ MMC|)}{(|CTE\ MMC - CTE\ Fe|)}$$

wherein $0.5 \leq x \leq 2$ and CTE WC, CTE MMC and CTE Fe are the CTE values for the sintered cemented carbide, metal matrix composite, and iron-based alloy in 1/K respectively at 900° C. to 1100° C. Wear resistant articles made according to methods described herein can have any compositions and/or properties described in Section I above.

In some embodiments, the metal matrix composite layer is initially provided as a cloth-like sheet. Hard particles and powder nickel-based alloy or powder cobalt-based alloy can be blended in an organic carrier. Compositional parameters of the mixture can be consistent with the desired compositional parameters of the metal matrix composite layer described in Section I above. The hard particle-powder alloy mixture is combined with organic binder to fabricate a sheet carrying the mixture. The organic binder and hard particle-powder alloy mixture can be mechanically worked or processed to trap the particulate mixture in the organic binder. In one embodiment, for example, the hard particle-powder alloy mixture is combined with 3-15 vol. % PTFE and mechanically worked to fibrillate the PTFE and trap the particulate mixture. Mechanical working can include rolling, ball milling, stretching, elongating, spreading or combinations thereof. In some embodiments, the sheet comprising the hard particle-powder alloy mixture is subjected to cold isostatic pressing. The resulting sheet can have a low elastic modulus and high green strength. In some embodiments, a sheet comprising organic binder and the hard particle-powder alloy mixture is produced in accordance with the disclosure of one or more of U.S. Pat. Nos. 3,743,556, 3,864,124, 3,916,506, 4,194,040 and 5,352,526, each of which is incorporated herein by reference in its entirety.

An assembly is formed by positioning the sheet between the sintered cemented carbide layer and iron-based alloy layer. The resulting assembly is placed into a vacuum furnace and heated to sinter and/or melt the powder nickel-based alloy or cobalt-based alloy of the cloth, thereby forming a metal matrix composite layer, which bonds the sintered cemented carbide layer to the iron-based alloy layer. Sintering temperatures and times are dependent on the specific composition of the powder nickel-based alloy or powder cobalt-based alloy. Sintering temperatures, for example, can generally range from 1100° C. to 1250° C.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An article comprising:
a layer of sintered cemented carbide bonded to a layer of iron-based alloy via a metal-matrix composite bonding layer, wherein coefficients of thermal expansion (CTE) of the sintered cemented carbide layer, metal matrix composite bonding layer, and iron-based alloy layer satisfy the relation:

$$x = \frac{(|CTE\ WC - CTE\ MMC|)}{(|CTE\ MMC - CTE\ Fe|)}$$

wherein $0.5 \leq x \leq 2$ and CTE WC, CTE MMC and CTE Fe are the CTE values for the sintered cemented carbide layer, metal matrix composite layer, and iron-based alloy layer in 1/K respectively at 900° C. to 1100° C.

2. The article of claim 1, wherein (CTE Fe–CTE WC) is 2 to $6 \times 10^{-6}$ 1/K.

3. The article of claim 1, wherein (CTE Fe–CTE WC) is 3 to $5 \times 10^{-6}$ 1/K.

4. The article of claim 1, wherein the layer of sintered cemented carbide is free of cracks.

5. The article of claim 1, wherein the coefficients of thermal expansion increase in a direction from the sintered cemented carbide to the iron-based alloy, such that CTE Fe>CTE MMC>CTE WC.

6. The article of claim 1, wherein metallic binder is present in an amount of 6 to 25 weight percent of the sintered cemented carbide layer.

7. The article of claim 1, wherein the iron-based alloy layer comprises nickel in an amount of 25-35 weight percent and cobalt in an amount of 6-25 weight percent.

8. The article of claim 1, wherein the layer of sintered cemented carbide has thickness greater than 5 mm.

9. The article of claim 1, wherein hard particles are present in the metal matrix composite bonding layer in an amount of 30 to 60 weight percent, the hard particles comprising metal carbides, metal nitrides, metal carbonitrides, metal borides, metal silicides, cemented carbides, cast carbides, intermetallic compounds, or mixtures thereof.

10. The article of claim 9, wherein the hard particles comprise tungsten carbide particles.

11. The article of claim 1, wherein the metal matrix composite bonding layer comprises nickel-based matrix alloy.

12. The article of claim 1, wherein the metal matrix composite bonding layer comprises cobalt-based matrix alloy.

13. A method of making a layered article comprising:
bonding a layer of sintered cemented carbide to a layer of iron-based alloy via a metal-matrix composite bonding layer, wherein coefficients of thermal expansion (CTE) of the sintered cemented carbide layer, metal matrix composite bonding layer, and iron-based alloy layer satisfy the relation:

$$x = \frac{(|CTE\ WC - CTE\ MMC|)}{(|CTE\ MMC - CTE\ Fe|)}$$

wherein $0.5 \leq x \leq 2$ and CTE WC, CTE MMC and CTE Fe are the CTE values for the sintered cemented carbide layer, metal matrix composite layer, and iron-based alloy layer, metal matrix composite, and iron-based alloy in 1/K respectively at 900° C. to 1100° C.

14. The method of claim 13, wherein bonding the layer of sintered cemented carbide to the layer of iron-based alloy comprises positioning a sheet between the sintered cemented carbide layer and the iron-based alloy layer to provide a layered assembly, the sheet comprising a mixture of hard particles and powder cobalt-based alloy or powder nickel-based alloy, the hard particles comprising metal carbides, metal nitrides, metal carbonitrides, metal borides, metal silicides, cemented carbides, cast carbides, intermetallic compounds, or mixtures thereof.

15. The method of claim 14 further comprising heating the layered assembly to sinter or melt the powder cobalt-based alloy or powder nickel-based alloy, thereby forming the metal matrix composite layer bonding the sintered cemented carbide layer to the iron-based alloy layer.

* * * * *